United States Patent

Wupper et al.

[15] 3,652,784

[45] Mar. 28, 1972

[54] AUTOMATIC RANGE ADJUSTMENT OF OBJECTIVES IN TELEVISION CAMERAS

[72] Inventors: Max E. Wupper; Richard von Felgel-Farnholz; Dietmar Gornott, all of Darmstat, Germany

[73] Assignee: Fernseh GmbH, Darmstadt, Germany

[22] Filed: Dec. 12, 1969

[21] Appl. No.: 884,514

[30] Foreign Application Priority Data

Dec. 21, 1968 Germany ......................P 18 16 331.0

[52] U.S. Cl. ...................178/5.2 R, 178/DIG. 29, 343/6 TV, 356/4, 356/5, 178/7.2, 178/7.42

[51] Int. Cl. ..........................................................H04n 1/00

[58] Field of Search ..................343/7, 6 NO, 6 TV; 356/4, 5; 178/5.2, 7.2 E, DIG. 26, 6

[56] References Cited

UNITED STATES PATENTS

| | | | |
|---|---|---|---|
| 3,424,531 | 1/1969 | Bender et al. | 356/4 |
| 3,442,193 | 5/1969 | Pagel | 356/4 |
| 3,495,906 | 2/1970 | Firman | 356/4 |
| 3,498,717 | 3/1970 | Kumagai | 356/5 |
| 3,515,480 | 6/1970 | Altman et al. | 356/4 |

*Primary Examiner*—Robert L. Richardson
*Assistant Examiner*—Richard P. Lange
*Attorney*—Littlepage, Quaintance, Wray & Aisenberg

[57] ABSTRACT

A modulated light source and a receiver determine range of scenes to be photographed. Preferably, ranging is accomplished during vertical flyback so that ranging light rays do not interfere with the ambient light reception and control signals do not interfere with camera electronics. Physical or electronic means are employed to ensure camera insensitivity during ranging.

14 Claims, 1 Drawing Figure

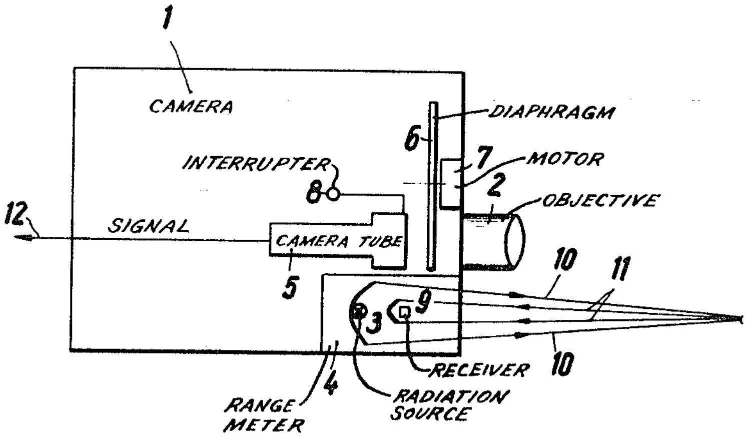
Inventor:
Max Eugen Wupper
Richard von Felgel Farnholz
Dietmar Gornott
by Littlepage, Quaintance, Wray & Aisenberg
Attorneys

AUTOMATIC RANGE ADJUSTMENT OF OBJECTIVES IN TELEVISION CAMERAS

BACKGROUND OF THE INVENTION

The invention relates to a system for the automatic range adjustment of an objective of a television camera.

In television cameras employed in television studios, the optical resolution is adjusted by hand. When working with moving scenes as well as with movements of the camera, this type of adjustment introduces problems. The adjustment is particularly critical in television pictures because, on account of the special lighting conditions, the cameras are usually operated with open apertures.

SUMMARY OF THE INVENTION

The purpose of the present invention is to provide a simple device, whereby the adjustment of the camera to the range of the object being photographed is effected automatically. Care is taken to ensure that the actual picture exposure is not disturbed by the operation of measuring the range.

The invention is characterized by the feature that to the objective there is coupled a range measuring device which operates by means of a modulated—preferably an infrared—radiation source, whose modulating frequency is synchronized with the slow picture scanning frequency, or field frequency.

According to a further development of the invention, the radiation source emits light pulses which occur during the vertical flyback of the scanning spot.

A further feature of the invention provides that the television camera is rendered insensitive to light for the duration of the range measuring light pulses.

According to a further feature of the invention, in the case of color television cameras operating on the time-sequential method, the light pulses are delivered during a time at which the color television camera is insensitive, at least to the color of the light pulses.

Finally, the invention includes the use of a laser as the radiation source for the range meter.

The invention will now be explained in more detail with reference to a practical example shown in the accompanying drawing.

BRIEF DESCRIPTION OF THE DRAWING

The drawing is a schematic representation of a television camera with an objective range adjustment device.

DETAILED DESCRIPTION OF THE DRAWING

In the drawing only those parts are represented which are necessary for an understanding of the invention. In the television camera 1, the scenes which are to be photographed (not shown in the drawing) are projected by the aid of the objective 2 on the photolayer of the television camera tube 5. The video signal produced in the television camera tube 5 leaves the camera 1 at 12. A range meter 4, which is arranged inside the television camera 1, comprises a radiation source 3 and a receiver 9. The beam 10 delivered by the radiation source 3 is situated, preferably, in the long wave infrared range, so that there is the least possible disturbance to the television exposure which is essentially limited to the visible region. At the same time, however, the spectral sensitivity of the receiver 9 itself sets certain limits in respect of the wavelength of the radiation, so that this fact prevents the mere placing of the radiation 10 in any wavelength region, to which the camera tube 5 is completely insensitive.

In a conventional manner, the output of receiver 9 is coupled to an actuator for continuously adjusting the range, i.e., focus of camera objective 2. The use of an infrared filter in the beam path of the television camera is not acceptable in many cases because such filters do not possess ideal permeability curves in the visible region. Accordingly, disturbances of the television exposure by the range finder 4 are to be expected unless the method of the invention is employed.

Furthermore, disturbances will result in certain conditions if the modulation frequency of the range finder 4 strays into the electrically sensitive parts of the television camera 1.

Because standing disturbance effects in a television picture are to be regarded as less damaging than moving disturbance effects, according to the invention the modulation frequency is synchronized with the slow picture scanning frequency, that is to say in general with the vertical frequency.

If the light pulses are emitted during the vertical frequency flyback, then the disturbances caused by the modulation of the radiation source 3 will not be visible in the reproduced television picture.

In order, however, to isolate from the television exposure the light spot thrown upon the scene by the radiation source 3, it is proposed, according to a further feature, that camera shall be insensitive to light for that duration of time during which the light pulses appear. For this purpose it is possible, for example, to introduce into the beam path of the television camera 1 a rotating sector diaphragm 6 driven by a motor 7. The rotation speed of the motor 7 can then by synchronized with the modulation frequency of the radiation source 3, i.e., with the pulse sequence frequency of the light pulses.

In many camera tubes in use at the present time it is possible to avoid this additional mechanical construction by arranging that, during the appearance of the light pulses, the electrode voltage of the camera tube 5 which determines the light sensitivity is so changed as to bring about a reduction in the sensitivity. Thus, for example, it is possible in the image orthicon and the SEC camera tube to interrupt the acceleration voltage of the picture converter section, applied at the point 8, this interruption taking place during the appearance of the light pulses so that the latter are not included in the exposure.

The application of the arrangement according to the invention is not limited to use in black and white cameras, but also is suited in a similar manner to color television cameras. A further development relates to color television cameras, which operate in the time-sequential manner, and in which, therefore, the three basic colors are photographed in succession. In such color television cameras, the light pulses can either be radiated during the time over which the television camera is not sensitive to the color of the radiation emitted by the radiation source, that is to say, for example, if the radiation of the source is red, the light pulses are emitted during the blue-sensitive phase of the color television camera, or else, in the case of the time-sequential color television camera, a special phase can be provided, during which the camera is non-sensitive to light and the radiation source delivers a light pulse.

Among the suitable radiation sources 3 is included a laser, which delivers an intensely concentrated beam, which, if necessary, consists of short light pulses.

In general, in the range measuring device according to the invention, the receiver 9 is automatically and mechanically moved to a point which is correct for the distance to be measured. Then, that movement can be transferred without difficulty to the distance scale of the objective by means of known devices, e.g., toothed wheel gearing. For example, range measuring devices are known which focus reflected light in a focal point of an objective. In such a range measuring device, the receiver may consist of two photosensitive elements arranged one after the other in the direction of the optical axis. The photosensitive elements feed an electrical bridge circuit which controls a mechanical drive, which in turn moves the objective so that the focal point of the returning light is centered between the photosensitive elements. Suitable systems for range detection are well known. Examples of suitable well known ranging systems are shown in U.S. Pat. Nos. 3,424,531 and 3,442,193.

We claim:

1. Range measurement apparatus for the automatic range adjustment of an objective of a television camera comprising: television camera means having photosensitive means, adjustable objective means for focusing an image on the photosensitive means, electronic means for converting the image to signals, means for periodically rendering said camera means at least partial insensitive to an image, and further comprising range measuring means connected to the camera means including a modulated radiation source for irradiating an object to be photographed, and a receiver for receiving reflected radiation from the object, and coordinating means connected to the range measuring means and to the camera means for coordinating operation of the range measuring means during said at least partial insensitivity of the means and camera means.

2. Range measurement apparatus of claim 1 wherein the electronic means includes means for scanning the photosensitive means with a relatively fast picture scanning frequency in a first direction and a relatively slow picture scanning frequency in a second direction and wherein the coordinating means includes means connected to the scanning means for synchronizing modulation of the radiation source with the slow picture scanning frequency.

3. The range measurement apparatus of claim 1 wherein the radiation source comprises an infrared light source.

4. The range measurement apparatus of claim 1 wherein modulation frequency of the radiation source is equal to field frequency of the television camera means.

5. The range measurement apparatus of claim 1 wherein the radiation source is a means for producing light pulses.

6. The range measurement apparatus of claim 5 wherein the means for producing light pulses is operative during vertical flyback in the television camera means.

7. Range measurement apparatus of claim 5 wherein the means renders the camera means for periodically rendering the camera means at least partically insensitive to light during promulgation of light pulses from the modulated radiation source.

8. The range measurement apparatus of claim 7 wherein the means for periodically rendering the camera means at least partically insensitive comprises a diaphragm positioned between the object to be photographed and the photosensitive means for interrupting light flux to the camera means during promulgation of light pulses from the modulated radiation source.

9. The range measurement apparatus of claim 8 wherein the diaphragm comprises a rotating sector diaphragm mounted between the objective means and the photosensitive means in the camera means.

10. Range measurement apparatus of claim 7 wherein electrode voltage in the electronic means comprises a camera tube means with electrodes, and wherein the means for periodically rendering the camera means at least partically insensitive varies electrode voltage to reduce camera sensitivity when light pulses are produced by the radiation source.

11. The range measurement apparatus of claim 10 wherein the camera tube means comprises picture converter means having acceleration voltage applying means, and wherein the means for periodically rendering the camera means at least partically insensitive is connected to the acceleration voltage means for reducing acceleration voltage during promulgation of light pulses by the modulated radiation source.

12. Range measurement apparatus of claim 1 wherein the camera means comprises color television camera means, wherein the electronic means comprises sequentially varied color sensitive scanning means, and wherein the coordinating means is connected to the sequentially varied color sensitive scanning means and to the radiation source for enabling operation of the radiation source when the color scanning means is insensitive to light of a color produced by the radiation source.

13. The range measurement apparatus of claim 12 wherein the color scanning means comprises means for producing four time-sequential phases and means sensitive to unique colors during three sequential phases and insensitive to any color during a fourth phase, and wherein the coordinating means is connected to the said color scanning means and to the modulated radiation source for enabling operation of the source during a fourth sequential phase of the color scanning means.

14. The range measurement apparatus of claim 12 wherein the coordinating means is connected to the color scanning means and to the radiation source for enabling operation of the radiation source when the color scanning means is insensitive to red.

* * * * *

UNITED STATES PATENT OFFICE
CERTIFICATE OF CORRECTION

Patent No. 3,652,784 Dated March 28, 1972

Inventor(s) Max Eugen Wupper, Richard von Felgel, Dietmar Gornott

It is certified that error appears in the above-identified patent and that said Letters Patent are hereby corrected as shown below:

In Claim 1:

Column 1, line 2, "partial" should be --partially--;

Last two lines of Claim 1, delete "means and".

In Claim 7, the claim should read:

7. Range measurement apparatus of Claim 5 wherein the means for periodically rendering the camera means at least partially insensitive renders the camera means insensitive to light during promulgation of light pulses from the modulated radiation source.

Signed and sealed this 29th day of August 1972.

(SEAL)
Attest:

EDWARD M.FLETCHER,JR.
Attesting Officer

ROBERT GOTTSCHALK
Commissioner of Patents